April 27, 1937.  C. W. JOHNSON ET AL  2,078,853
REMOVABLE DENTAL BRIDGE
Filed Sept. 14, 1935
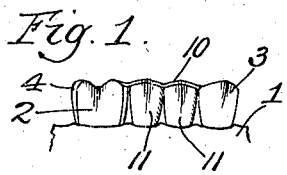 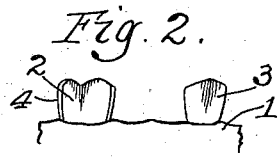 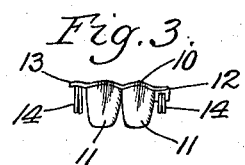
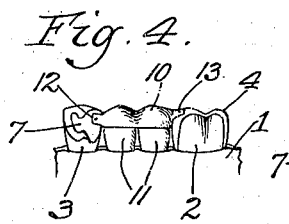 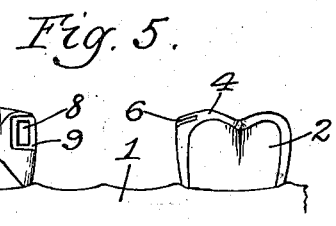 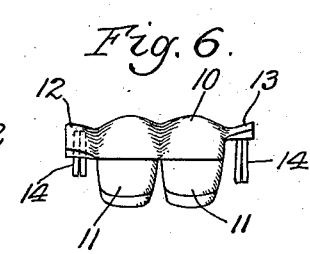
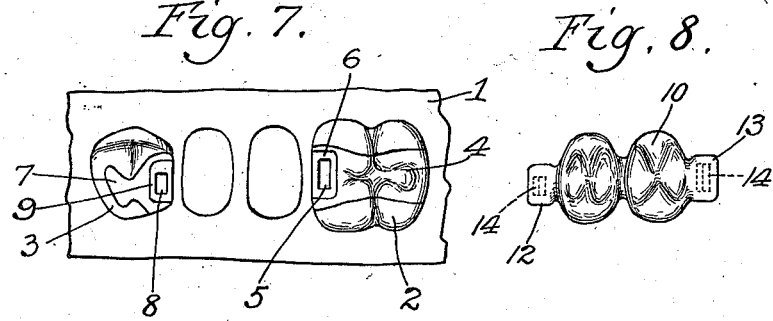
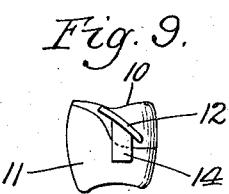 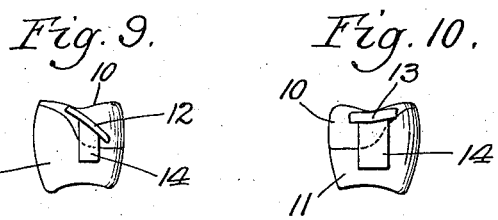 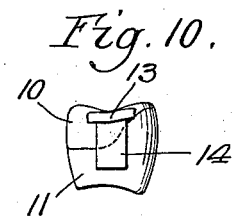
Inventors
Louis Spinar
Carroll W. Johnson
by Parker & Carter
Attorneys Patented Apr. 27, 1937

2,078,853

UNITED STATES PATENT OFFICE 2,078,853

REMOVABLE DENTAL BRIDGE

Carroll W. Johnson and Louis Spinar,
Chicago, Ill.

Application September 14, 1935, Serial No. 40,550

2 Claims. (Cl. 32—5)

This invention relates to a dental appliance, particularly to a removable dental bridge.

It has for one object to provide means for supporting a removable dental bridge, carrying one or more artificial teeth, in and from two teeth remaining in the jaw.

Another object is to provide in connection with such a removable bridge, supports in inlays positioned in teeth in which means are provided above the gum line for preventing splitting of the sound teeth and for preventing tipping and rocking of the removable bridge.

Another object of the invention is to provide a removable dental bridge which carries at or near its upper surface limiting, positioning and steadying parts, which co-operate with similar parts formed in inlays in sound teeth.

Other objects will appear from time to time in the specification and claims.

The invention is illustrated more or less diagrammatically in the accompanying drawing, wherein:—

Figure 1 is an outside view of two sound teeth supporting the removable bridge which carries two artificial teeth;

Figure 2 is a similar view, showing the sound teeth without the bridge;

Figure 3 is a view showing the bridge removed;

Figure 4 is a view generally similar to Figure 1, but taken from the inside of the mouth, or back of the teeth;

Figure 5 is a view from the inside of the mouth on an enlarged scale, showing the sound teeth with the inlays, but with the bridge removed;

Figure 6 is a view on the same scale as Figure 5, showing the bridge itself;

Figure 7 is a top plan view of a portion of the jaw, showing the sound teeth, including the inlays and the seats for the removable bridge;

Figure 8 is a top plan view on the same scale as Figure 7, showing the bridge separately;

Figure 9 is an end elevation of the bridge; and

Figure 10 is a similar elevation taken at the opposite end.

Like parts are designated by like characters throughout the specification and drawing.

1 indicates generally a portion of the jaw. 2 is one tooth still in position in the jaw and 3 is a second tooth similarly in position. As shown, the tooth 2 is provided with an inlay 4. In the side of this inlay, opposite the tooth 3, is positioned a hollow, bridge-receiving member 5 and about this hollow is formed a counter-sunk portion 6.

An inlay 7 is positioned in the tooth 3 and in this inlay is positioned or formed a bridge-receiving pocket 8, about which, at its upper end, is formed a counter-sunk portion 9.

10 is a bridge which may be of any suitable form, contour or material. As here shown its upper surface is shaped to form a crown for two artificial teeth 11, 11, which are fastened to and supported by it. At each end the bridge projects beyond the teeth, as at 12, 13, and these projecting portions are of such size and shape that they fit snugly into the counter-sunk portions 9 and 6, respectively. As indicated generally in the figures and particularly in Figures 9 and 10, the extensions 12 and 13 are positioned with respect to the bridge and the artificial teeth carried by the bridge, so that when the bridge is in position they conform in contour and lie flush with the upper surface of the inlays 4 and 7 of the teeth 2 and 3. It is obvious that for different teeth and for different inlays the contour of these extensions 12 and 13 will be changed, but in each case, the inlays are provided with counter-sunk portions about the bridge-receiving sockets, and the bridge itself is provided with extensions shaped to fit snugly into and to fill completely the counter-sunk portions.

Each of the extensions 12 and 13 is provided with a socket-engaging portion 14, 14. As shown each of these is made of a double spring member so that it somewhat resists insertion into the sockets 5 and 8 and resists displacement. In other words, the members 14 constitute spring devices for retaining the bridge in position and although it can be removed deliberately, the members 14 prevent its accidental displacement. The spring members 14 are shaped originally, and may from time to time be adjusted, if necessary, to provide sufficient friction to hold the bridge tightly seated in the sockets. Ordinarily they spring slightly apart and they may subsequently be bent to increase or retain the same amount of spring or some spacing member may be driven between them if that becomes necessary.

In any dental appliance designed to be placed in the mouth, to be attached to teeth and co-operate with other teeth, the proportions and shapes of different installations will vary almost infinitely and the particular arrangement and proportion shown is, therefore, merely illustrative of one typical solution of one individual problem. Ordinarily a removable bridge is useful where one or more teeth have been removed and where teeth remain and it is desired to use the remaining teeth to support a bridge for artificial teeth.

The present invention, therefore, aims to provide a mechanical arrangement for supporting the bridge removably and to do so with a minimum of cutting in the surviving teeth. In the particular form shown the adjacent teeth are provided with inlays. Frequently it happens that the adjacent teeth will require inlays, because of decay or injury to them, and where that is the case, it is convenient to place the socket members for the bridge in the inlay. This is not essential, however, and if no inlays are necessary in the teeth for filling cavities or otherwise repairing defects, the socket member may be inserted directly in the tooth and while in that sense it is in effect mechanically an inlay and differs from the ordinary inlay which is primarily needed to fill a cavity or to repair some other defect in the tooth.

Whether the socket is inserted directly in the tooth or in an inlay, it is important that the socket member be open only at the top. It is not split down the side and, therefore, the size of the opening can be reduced to a minimum and the biting pressure on the bridge cannot split or tend to split the tooth as would be the case were the socket member split down the side.

In all cases where removable bridges are necessary, means must be provided to prevent the bridge from tipping. The normal biting strains are very heavy and if the bridge is not securely anchored against tipping, normal chewing will tend to tip it and so to dislodge it or to break it or to break one or more of the teeth upon which it is supported. It is to resist this tipping that the socket members are provided with relatively large and preferably angular counter-sunk portions about their upper ends. Into these counter-sunk portions the extensions 12 and 13, which are made of the same shape as the counter-sunk portions, fit and since these extensions are relatively larger than would be necessary for mere support, they furnish a large surface, first to support the bridge, and second to prevent its tilting or twisting, because instead of having merely pin-like members fitting into the sockets, there are these added extensions which furnish a relatively very considerable area about the springs 14 and resting upon the adjacent teeth and within the counter-sunk portions and this is sufficient to hold the bridge against accidental movement and in particular it is sufficient to prevent tipping and rocking of the bridge and no matter what the contour of the teeth supporting the bridge, they are always provided with the necessary socket members to receive the portions 14 of the bridge and with suitable counter-sunk areas on the upper face of the tooth and about the sockets to receive the enlarged extensions from the bridge.

Ordinarily the bridge and the socket portions are of metal, although they might be of any suitable material, and the artificial teeth, if any are carried by the bridge, may be of metal, porcelain or any other suitable material. The invention is, therefore, not limited to the use of any particular material in any part.

It will be realized that whereas we have herewith shown and described a practical operative device, nevertheless many changes might be made in the size, shape, number and disposition of parts, without departing from the spirit of the invention and we wish, therefore, that our showing and description be taken as in a sense diagrammatic.

In particular, the shape of the portion on the bridge which fits into the counter-sink might be almost infinitely varied. Where we have spoken of the countersink and the member which fits into it as being "of angular cross section", we mean by this expression to include any shape which would resist turning; thus even an elliptical or irregularly curved counter-sink is within the contemplation of our invention as it is one of the purposes of the countersink to prevent tipping, tilting, rotation or any other movement.

We claim:

1. In a removable dental bridge supporting device, a pair of socket members, each socket member adapted to be supported within the body of a tooth, said socket member having an exposed side surface conforming generally to the natural outline of the tooth, and having a socket set inwardly from said exposed side surface, said socket opening toward the occlusal surface only of the tooth, said socket member being provided with a countersink surrounding the opening of the socket, and a bridge member adapted to support one or more artificial teeth, a socket engaging member at each end of the bridge, said bridge member including countersink engaging portions surrounding each said socket engaging member at the base thereof and conforming in thickness and general contour to the depth and contour of the respective countersink portions and adapted to closely interfit therewith to prevent relative movement therebetween, said bridge member and said socket members engaging only throughout the contacting areas of the countersinks and countersink engaging portions whereby the side surfaces of the socket supporting teeth and the artificial teeth carried by the bridge are left free.

2. A removable dental bridge supporting device of the character described in claim 1, wherein the socket engaging members each comprise depending divergent spring arms, the free ends of which frictionally engage the inner wall surfaces of the respective socket members.

LOUIS SPINAR.
CARROLL W. JOHNSON.